(12) United States Patent
Hovi et al.

(10) Patent No.: US 9,367,416 B2
(45) Date of Patent: Jun. 14, 2016

(54) SAFETY CIRCUIT OF AN ELEVATOR, AND METHOD FOR IDENTIFYING A FUNCTIONAL NONCONFORMANCE OF A SAFETY CIRCUIT OF AN ELEVATOR

(71) Applicant: KONE CORPORATION, Helsinki (FI)

(72) Inventors: Antti Hovi, Hyvinkää (FI); Ari Kattaninen, Hyvinkää (FI); Risto Jokinen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 467 days.

(21) Appl. No.: 13/897,474

(22) Filed: May 20, 2013

(65) Prior Publication Data

US 2014/0032970 A1    Jan. 30, 2014

Related U.S. Application Data

(63) Continuation of application No. PCT/FI2011/000049, filed on Nov. 24, 2011.

(30) Foreign Application Priority Data

Dec. 1, 2010  (FI) ..................................... 20106264

(51) Int. Cl.
  *B66B 1/34*  (2006.01)
  *G06F 11/26*  (2006.01)
  *B66B 5/00*  (2006.01)

(52) U.S. Cl.
  CPC .............. *G06F 11/26* (2013.01); *B66B 5/0031* (2013.01)

(58) Field of Classification Search
  CPC ............................. B66B 5/0031; G06F 11/26
  USPC .......... 187/247, 277, 391–393; 340/514, 516, 340/3.1, 3.43, 3.54; 714/48; 701/45, 50; 700/20, 21, 27; 710/109, 110; 709/208, 709/209, 211
  See application file for complete search history.

(56) References Cited

U.S. PATENT DOCUMENTS

| | | | | |
|---|---|---|---|---|
| 4,002,973 A | * | 1/1977 | Wiesendanger | B66B 5/0087 187/391 |
| 4,703,325 A | | 10/1987 | Chamberlin et al. | |
| 4,977,984 A | | 12/1990 | Arnosti et al. | |
| 5,107,964 A | * | 4/1992 | Coste | B66B 13/24 187/280 |
| 5,360,952 A | | 11/1994 | Brajczewski et al. | |
| 5,487,448 A | * | 1/1996 | Schollkopf | B66B 5/0006 187/247 |

(Continued)

FOREIGN PATENT DOCUMENTS

| CN | 1812923 A | 8/2006 |
|---|---|---|
| CN | 101539604 A | 9/2009 |

(Continued)

*Primary Examiner* — Anthony Salata
(74) *Attorney, Agent, or Firm* — Birch, Stewart, Kolasch & Birch, LLP

(57) ABSTRACT

The invention relates to a safety circuit of an elevator and also to a method for identifying a functional nonconformance of the safety circuit of an elevator. In the method a message is formed in node A, a testing field is added to the message for testing the operation of the safety circuit of an elevator, and the aforementioned message containing the testing field is sent from node A to the communications bus in the safety circuit of the elevator.

7 Claims, 3 Drawing Sheets

6: communications bus
8: LEDs
10: sensors determining the the position / locking of a landing door
11: sensor measuring the position of the elevator car in the elevator hoistway
12: relay of the safety breaker
13A, 13B: microprocessor
14A, 14B: transmitter / receiver circuit
15A, 15B: signal conductor
A: electronic supervision unit
B: car node
C: hoistway node

(56) References Cited

U.S. PATENT DOCUMENTS

| | | | | |
|---|---|---|---|---|
| 5,654,531 A * | 8/1997 | Farabee | B66B 1/18 | 187/247 |
| 5,854,454 A * | 12/1998 | Upender | H04L 12/40163 | 187/247 |
| 6,056,088 A | 5/2000 | Gerstenkorn | | |
| 6,173,814 B1 * | 1/2001 | Herkel | B66B 1/34 | 187/248 |
| 6,349,795 B1 * | 2/2002 | Tatsumi | B66B 1/34 | 187/247 |
| 6,467,583 B1 * | 10/2002 | Koura | H04L 12/403 | 187/247 |
| 6,471,011 B1 * | 10/2002 | Ando | B66B 1/34 | 187/247 |
| 7,353,914 B2 * | 4/2008 | Deplazes | B66B 5/0031 | 187/249 |
| 7,708,118 B2 * | 5/2010 | Tyni | B66B 13/22 | 187/391 |
| 7,891,467 B2 * | 2/2011 | Kattainen | B66B 5/0056 | 187/316 |
| 8,134,448 B2 * | 3/2012 | Oster | H04L 12/423 | 187/391 |
| 2011/0036668 A1 * | 2/2011 | Stratmann | B66B 5/0031 | 187/289 |
| 2011/0302466 A1 * | 12/2011 | Ikawa | B66B 1/34 | 714/704 |
| 2011/0303492 A1 | 12/2011 | Sonnenmoser et al. | | |

FOREIGN PATENT DOCUMENTS

| | | |
|---|---|---|
| EP | 1852382 A1 | 11/2007 |
| WO | 2010/097404 A1 | 9/2010 |

* cited by examiner

2: testing field
3: synchronization field
4: data field
5: checking field

6: communications bus
8: LEDs
10: sensors determining the the position / locking of a landing door
11: sensor measuring the position of the elevator car in the elevator hoistway
12: relay of the safety breaker
13A, 13B: microprocessor
14A, 14B: transmitter / receiver circuit
15A, 15B: signal conductor
A: electronic supervision unit
B: car node
C: hoistway node 2: testing field
9A, 9B, 9C: testing field reference

SAFETY CIRCUIT OF AN ELEVATOR, AND METHOD FOR IDENTIFYING A FUNCTIONAL NONCONFORMANCE OF A SAFETY CIRCUIT OF AN ELEVATOR

CROSS-REFERENCE TO RELATED APPLICATIONS

This application is a continuation of PCT International Application No. PCT/FI2011/000049 filed on Nov. 24, 2011 which claims priority under 35 U.S.C 119(a) to Application No. 20106264 filed Dec. 1, 2010 in Finland, all of which are hereby expressly incorporated by reference into the present application.

FIELD OF THE INVENTION

The invention relates to the identification of a functional nonconformance in the safety circuit of an elevator.

BACKGROUND OF THE INVENTION

The design instructions and design regulations concerning the safety circuits of an elevator are changing, especially as a result of developments in microprocessor technology and software technology. As a consequence of new design instructions and design regulations, the safety circuits of an elevator can be designed based on microprocessor control and on data bus architecture. A number of sensors measuring the operation of an elevator, for example, can be connected to the same data bus, and the operation of the elevator can be monitored with a separate electronic supervision unit connected to the data bus.

The purpose of the safety circuit of an elevator is to ensure the safe operation of the elevator system in all operating situations. In this connection also a high, generally at least SIL 2— or SIL 3—safety integrity level, is required of microprocessor-controlled supervision units, data buses, sensors, et cetera. For achieving an adequate safety level, devices and data buses must often be duplicated; duplication, on the other hand, increases the amount of components, circuits and wiring needed.

As circuits and wiring increase, the risk of a connection error or of a wiring error, or of connection of the wrong voltage to the signal conductors of a data bus, et cetera, also increases. The operating voltage for devices to be connected to a data transfer bus is also often carried in the same cable as the signal conductors. A breakage of the insulation of a conductor might cause a short-circuit or the connection of operating voltage to a signal conductor.

Therefore the safety circuit of an elevator must designed to be fail-safe such that the elevator is always removed from use in a fault situation of the safety circuit. Consequently it would be necessary to ensure that fault situations are identified and located as soon as possible in an early stage, at best already in connection with the installation of the elevator, in which case any fault situation will cause as little harm as possible to operation of the elevator.

Aim of the Invention

The aim of the invention is to improve the diagnostics of the safety circuit of an elevator. To achieve this aim the invention discloses a method and safety circuit of an elevator as defined in the claims. Some inventive embodiments and inventive combinations of the various embodiments are also presented in the descriptive section and in the drawings of the present application.

SUMMARY OF THE INVENTION

In the method according to the invention a message is formed in node A, and a testing field is added to the message for testing the operation of the safety circuit of an elevator. The message containing the aforementioned testing field is sent from node A to the communications bus in the safety circuit of the elevator. In a preferred embodiment of the invention the aforementioned message containing a testing field is received in node B from the communications bus in the safety circuit of the elevator, and a functional nonconformance of the safety circuit of the elevator is identified in node B on the basis of the testing field received. In a preferred embodiment of the invention a connection error and/or wiring error of node B is in this case identified on the basis of the testing field received. In the most preferred embodiment of the invention an incorrect polarity of the communications bus is in this case identified as a connection error of node B.

In a preferred embodiment of the invention a signal is formed in node B for indicating a functional nonconformance of the safety circuit of an elevator. The aforementioned functional nonconformance of the safety circuit of the elevator is in this case preferably a connection error and/or wiring error of node B. In one embodiment of the invention with the signal formed the means in node B are controlled to indicate a functional nonconformance of the elevator. In one embodiment of the invention the signal formed is sent via a communications bus to a second node connected to the communications bus for indicating a functional nonconformance.

In one embodiment of the invention one or more references of a testing field are recorded in the memory of node B for identifying a functional nonconformance of the safety circuit of the elevator, the testing field received is compared to the aforementioned one or more references of a testing field that are recorded in the memory of node B and a functional nonconformance of the safety circuit of the elevator is identified on the basis of a comparison of the testing field received and the one or more references of a testing field that are recorded in the memory.

In one embodiment information about the degree of severity of the functional nonconformance indicated by the reference in question is connected in connection with one or more references of the testing field in the memory of node B and also a signal is formed in node B, which signal indicates the greatest in degree of its severity of the detected simultaneous functional nonconformances of the safety circuit. In this way, in addition to locating a fault, also the operating condition of the safety circuit of an elevator can be better diagnosed.

The safety circuit of an elevator according to the invention comprises a communications bus, nodes connected to the communications bus and also sensors and/or actuators relating to the functionality of the safety circuit, said sensors being connected to the nodes. One or more of the aforementioned nodes connected to the communications bus comprises a microprocessor and also a memory, in which a program to be executed is stored. The aforementioned microprocessor is configured to perform any of the methods according to what is disclosed above for identifying a functional nonconformance of the safety circuit of an elevator. In a preferred embodiment of the invention the safety circuit comprises at least two nodes, the nodes A and B. Node A is preferably an electronic supervision unit of the safety circuit of the elevator, which supervision unit is configured to determine the operating status of the elevator on the basis of measuring data received from the other nodes connected to the communications bus, and which electronic supervision unit is configured, when it detects a functional nonconformance of the elevator, to activate the machinery brake, to disconnect the electricity supply to the elevator motor and also to prevent the starting of the next run of the elevator.

The aforementioned communications bus is preferably a serial interface bus. In the most preferred embodiment of the invention the signal to be transferred in the communications bus is a differential signal, and the node B is configured to identify the incorrect polarity of the differential signal connected to the node B on the basis of the testing field received.

The aforementioned node B preferably comprises means for indicating a functional nonconformance of the elevator. In one embodiment the means for indicating a functional nonconformance of the elevator comprise a LED component in the node B, which LED component is controlled with a microprocessor in the node B with a pulse-like control signal, the frequency, duration and frequency of occurrence of which pulse is selected such that the flashing of the LED component gives visual information about the type of, and/or degree of severity of, the functional nonconformance detected.

In one embodiment of the invention information about a detected functional nonconformance of the safety circuit of an elevator is sent to a service center via a data transfer link. In this way the diagnostics of the elevator can be improved, more particularly relating to the remote monitoring/remote operation of the elevator. The aforementioned data transfer link can be e.g. an Internet connection or corresponding wireline connection; the data transfer link can also be implemented wirelessly, e.g. with a GSM connection or with a corresponding data transfer connection based on electromagnetic radiation.

By means of the invention, a functional nonconformance of the safety circuit of an elevator, more particularly a wiring error/connection error of the communications bus, can be reliably identified. In addition, by means of the invention the occurrence location of a fault can be located quickly and accurately and the located occurrence location can also be indicated to the serviceman repairing the fault or it can be sent to a service center. All this improves the diagnostics of a safety circuit of an elevator and, on the other hand, enables the repair of a fault as quickly as possible such that any harm caused by the fault and relating to operation of the elevator is the minimum possible.

The aforementioned summary, as well as the additional features and advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 2:
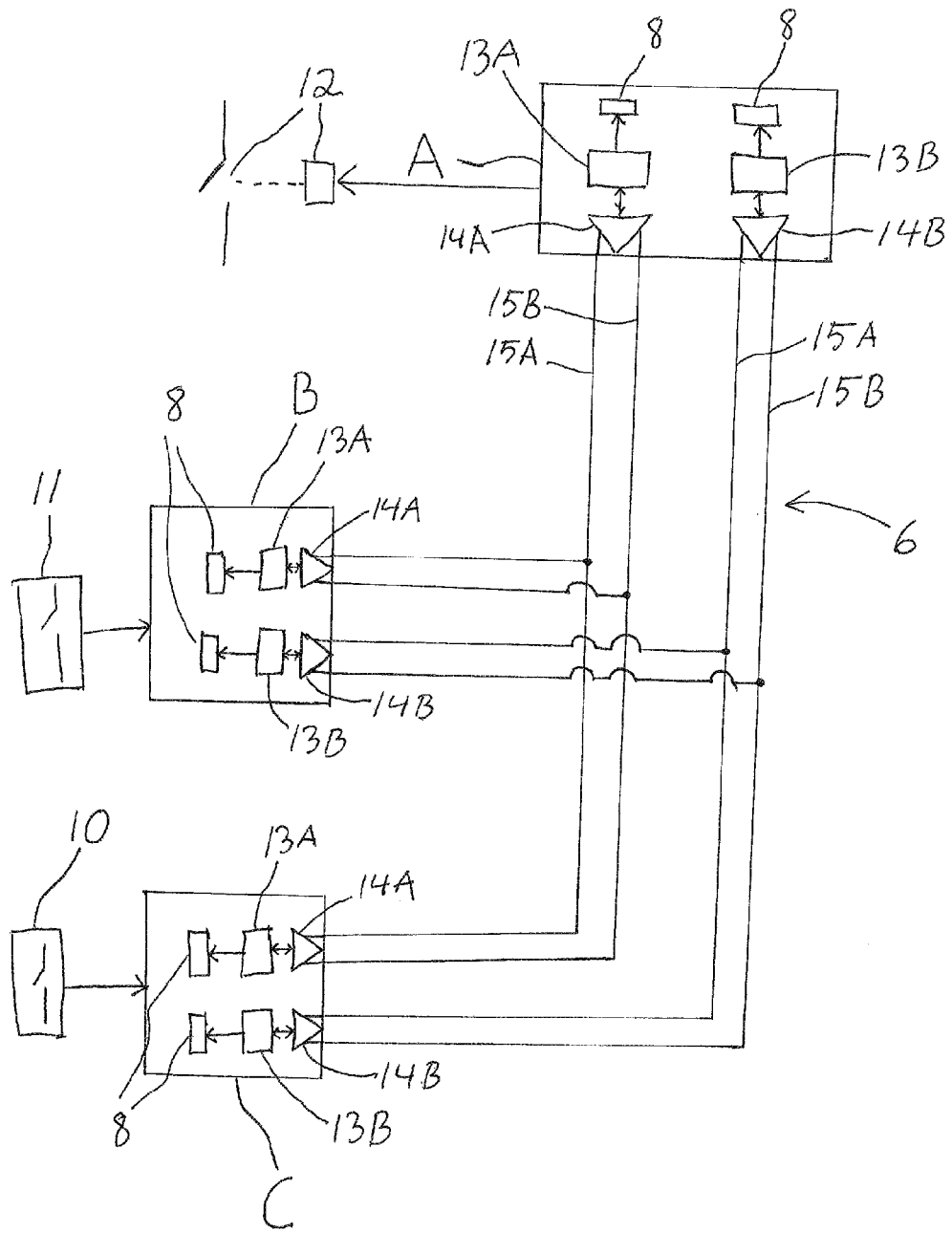
FIG. 2 presents as a block diagram one safety circuit of an elevator according to the invention

According to FIG. 2, the safety circuit of the elevator comprises nodes A,B,C, which are connected to a communications bus 6. The nodes A,B,C communicate with each other via the communications bus 6. The message 1 in the communications bus 6 is transferred as a differential mode serial communication signal using two parallel signal conductors 15A, 15B for the transfer of the signal. For this reason each of the nodes A, B, C comprises a transmitter/receiver circuit 14A, 14B for the differential signal, preferably for a RS485 signal and based on asynchronous so-called UART protocol. The transmitter/receiver circuits 14A, 14B send a differential signal to the communications bus 6 such that in the parallel signal conductors 15A, 15B the same signal is sent simultaneously but inverted. When it receives the aforementioned signal from the communications bus 6, the transmitter/receiver circuit 14A, 14B correspondingly reads from the differential the difference between the parallel signal conductors 15A, 15B.

According to FIG. 2, the safety circuit of the elevator is designed to meet the SIL 3 safety level, for which reason the communications bus 6 as well as the nodes A, B, C to be connected to the communications bus are duplicated in their structure. The duplicated structure is redundant such that in both differential data transfer channels 15A, 15B of the duplicated communications bus 6 data transfer occurs independently of the other channel. The nodes A, B, C comprise two microprocessors 13A, 13B as well as a transmitter/receiver circuit 14A, 14B connected to said microprocessors in each node. The first transmitter/receiver circuit 14A is connected to the first differential data transfer channel 15A, 15B and the second transmitter/receiver circuit 14B is connected to the second differential data transfer channel 15A, 15B according to FIG. 2. The electronic supervision unit of the elevator functions as the node A, which electronic supervision unit receives data via the communications bus 6 from the sensors connected to the nodes B, C and controls, if necessary, the safety breaker 12 of the elevator. The safety breaker 12 is a relay, the contact of which opens when the electricity supply to the control coil of the relay ceases. The contact of the relay of the safety breaker 12 is connected to the safety circuit of the elevator such that the electricity supply to the electromagnet of the machinery brakes of the hoisting machine (not presented in FIG. 2) of the elevator moving the elevator car ceases and the machinery brakes activate when the contact of the relay of the safety breaker 12 opens. In the same connection also the current supply to the electric motor of the hoisting machine is disconnected. The electronic supervision unit A of the elevator controls the contact of the relay of the safety breaker 12 open when it detects that the safety of the elevator is endangered. A varying amount of nodes A, B, C can be connected to the communications bus 6; one node B can be fitted in connection with the elevator car (not presented in FIG. 2), preferably on the roof of the elevator car, in which case a sensor 11 measuring the position of the elevator car in the elevator hoistway as well as a sensor (not presented in FIG. 2) measuring the position of the door of the elevator car can be connected to the node B. One node C can be fitted in the elevator hoistway (not presented in FIG. 2), and sensors (not presented in FIG. 2) determining the limits of the permitted movement of the elevator car in the proximity of the ends of the elevator hoistway, sensors 10 determining the position/locking of a landing door, et cetera, can be fitted to the node. One node can be fitted in the machine room, or in an elevator system without machine room in the top part (not presented in FIG. 2) of the elevator hoistway, and e.g. a sensor measuring the operation of the overspeed governor can be connected to the node. In one embodiment of the invention in the communications bus 6 time shared protocol is used such that the electronic supervision unit A sends to the nodes B, C via the communications bus 6 a message 1, and each of the nodes B, C responds to the message 1 within an individual time window. One problem in the safety circuit of the elevator according to FIG. 2 is the large amount of wiring, connections and also components needed, owing to which a better solution than prior art is needed for diagnosing various connection errors/wiring errors.

Figure 1:
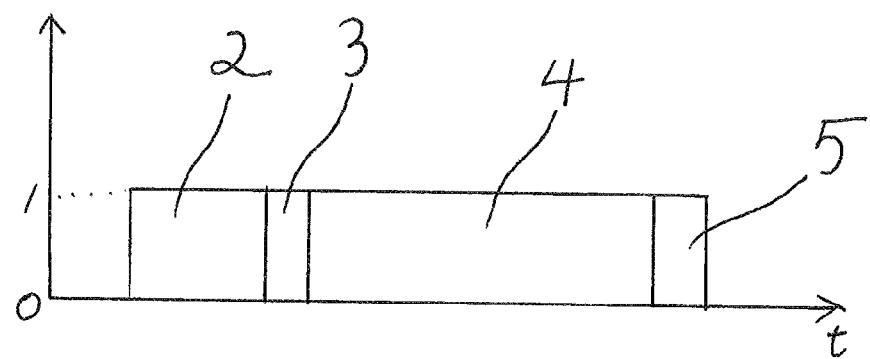
FIG. 1 illustrates one message structure according to the invention

FIG. 1 illustrates a message structure, which can be used e.g. in the safety circuit of an elevator according to FIG. 2 for identifying a functional nonconformance of the safety circuit of the elevator. The message 1 contains a synchronization field 3, on the basis of which the node receiving the message 1 is synchronized to the message to be received. In addition, the message 1 contains a checking field 5, such as parity/a checksum, on the basis of which the receiving node checks the correctness of the received data in the data field 4. In addition to the aforementioned, or differing from this, the message 1 can variably contain also other fields, e.g. an address field, with which the node for which the message 1 to be received is intended is specified; one possible field is an end field, with which the ending of the message is indicated, et cetera. In a preferred embodiment of the invention a testing field 2 is added to beginning of the message 1 for testing the operation of the safety circuit of the elevator. The following will present how the testing field 2 can be used for identifying a functional nonconformance of the safety circuit of an elevator.

Figure 3:
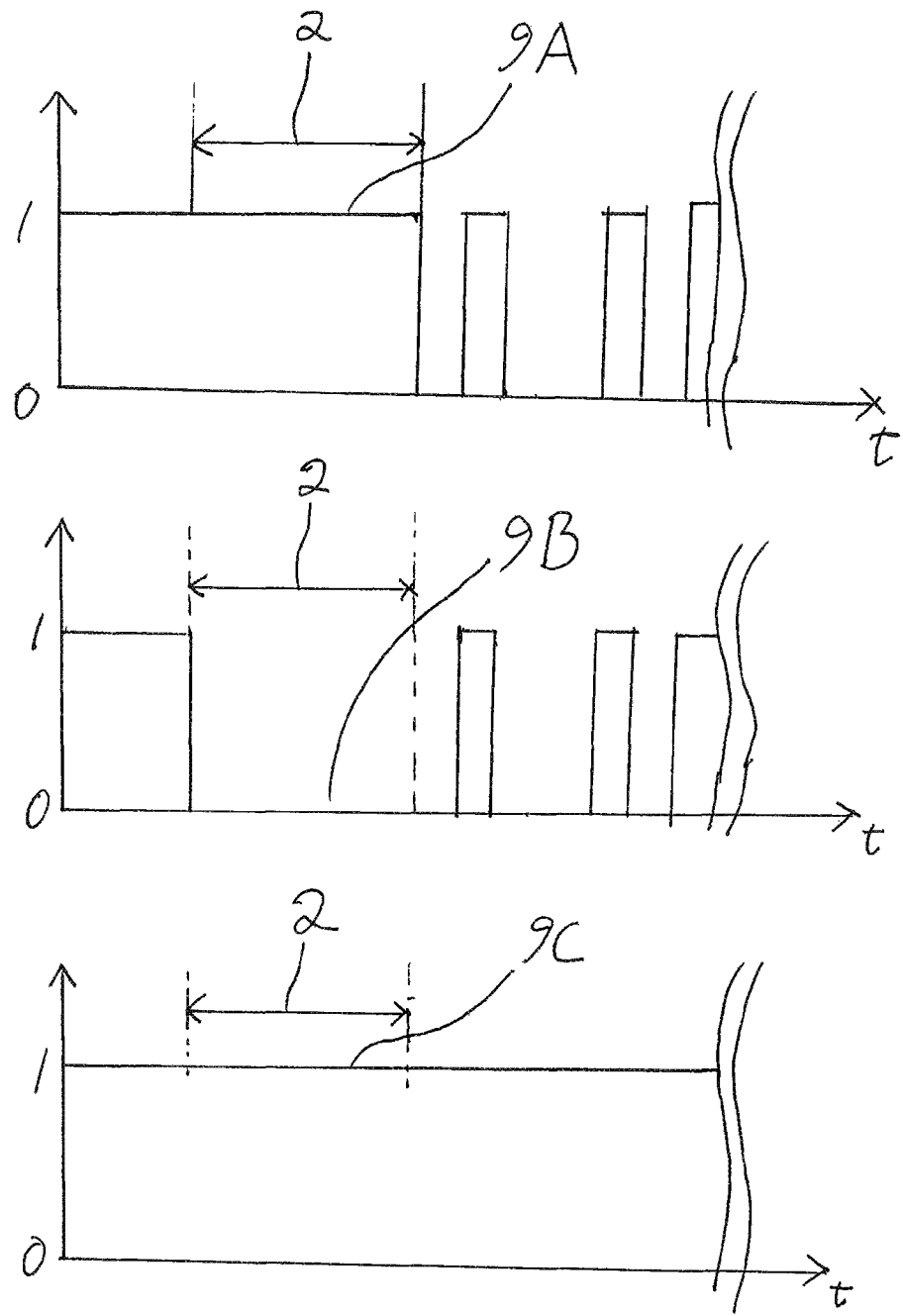
FIG. 3 illustrates some testing field references according to the invention

In a preferred embodiment of the invention the nodes A, B, C send, one at a time, a message 1 according to FIG. 1 to the communications bus 6, and the nodes in the bus receive the message from the communications bus 6. The references 9A, 9B, 9C of a testing field that are presented in FIG. 3 are recorded in the memory circuit of a node A, B, C for identifying a functional nonconformance of the safety circuit of the elevator. After it has received the testing field 2 belonging to the message 1, the microprocessor in a node A, B, C compares the testing field received with the references of the testing field in the memory and identifies a functional nonconformance of the safety circuit of the elevator on the basis of a comparison of the testing field 2 received and the references 9A, 9B, 9C of a testing field that are recorded in the memory. At its simplest, the testing field is designed such that the signal level, such as the voltage signal level or current signal level, of the testing field to be received remains unchanged for the entire duration of the testing field. In a preferred embodiment of the invention the graph 9A in FIG. 3 presents a reference of a testing field, when the safety circuit of the elevator is in operating condition. In this case the signal received by the microprocessor 13A, 13B in a node A, B, C remains in a logical "1" state for the entire duration of the testing field 2. If the signal received remains in a logical "0" state for the duration of the testing field 2, as is presented in the graph 9B in FIG. 3, the signal conductors connected to the transmitter/receiver circuit 14A, 14B of a node A, B, C are crossed. The graph 9C of FIG. 3 presents a situation in which it has been forgotten to connect the signal conductors 15A, 15B to a node A, B, C. In this case the rest of the message 1, as well as the testing field 2, remains in a logical "1" state.

A message 1 can also comprise more than one testing field 2. In addition, a pulse pattern of the testing field 2, and consequently also the references of the testing field, can differ from what is described above. The pulse pattern/references of a testing field 2 can also be different in each node A, B, C and in both data transfer channels 15A, 15B, in which case by comparing a testing field 2 and the references of the testing field a possible wiring error/connection error between the different nodes and data transfer channels can be deduced.

The microprocessor in a node A, B, C controls the LEDs 8 with control pulses, the duration and frequency of occurrence of which can determine which type of fault is in question. A node A, B, C comprises its own LEDs 8/microprocessor 13A, 13B for the diagnostics of both data transfer channels 15A, 15B, so that the faulty data transfer channel 15A, 15B can be located on the basis of a flashing LED.

In a preferred embodiment of the invention information about the degree of severity of the functional nonconformance indicated by the reference 9A, 9B, 9C in question is recorded in connection with the references 9A, 9B, 9C of a testing field. For example, in FIG. 3 the degree of severity of the fault indicated by the reference 9C can be determined to be larger than the degree of severity of the fault indicated by the reference 9B. In this case, if the testing field/testing fields in a node A, B, C simultaneously indicate(s) a number of different faults, the control of the LED is selected in the node in question always to indicate the greatest fault in terms of its degree of severity.

In the invention the means for indicating a functional nonconformance can comprise, in addition to or instead of LEDs, e.g. a loudspeaker, in which case a functional nonconformance can be indicated as an acoustic signal; the aforementioned means can also comprise a display, in which case a functional nonconformance can be indicated e.g. in symbols, in numbers or in text format.

In the preceding embodiments the invention is described in connection with the safety circuit of an elevator; however, the invention is also suited for use e.g. in the diagnostics of the safety circuits of an escalator and of a travelator.

The invention is described above by the aid of a few examples of its embodiment. It is obvious to the person skilled in the art that the invention is not only limited to the embodiments described above, but that many other applications are possible within the scope of the inventive concept defined by the claims.

The invention claimed is:

1. A method for determining functional nonconformance of a safety circuit, the safety circuit having a plurality of nodes which communicate with each other via a communications bus, the method comprising:
   adding, in a first node, a testing field to a message formed in the first node for testing the operation of the safety circuit of an elevator;
   transmitting the message containing the aforementioned testing field from the first node to a second node using the communications bus in the safety circuit of the elevator;
   receiving, in the second node, the message containing the testing field; and
   determining a connection error, a wiring error, or a voltage error in the second node as a functional nonconformance of the safety circuit on the basis of a received signal level corresponding to a duration of the testing field of the received message.

2. The method according claim 1, wherein:
   one or more references of a testing field are recorded in the memory of the second node for identifying the connection error, wiring error, or voltage error.

3. The method according to claim 2, wherein:
   the received signal level for the duration of the testing field is compared to the aforementioned one or more references of a testing field that are recorded in the memory of second node; and
   a functional nonconformance of the safety circuit of the elevator is identified on the basis of a comparison of the received signal level and the one or more references of a testing field that are recorded in the memory.

4. The method according to claim 2 or 3, wherein: information about a degree of severity of the functional nonconfounance indicated by the reference in question is connected in connection with one or more references of the testing field in the memory of the second node.

5. The method according to claim 4, wherein: forming a signal is formed in the second node that indicates the greatest in degree of severity of the detected functional nonconformances of the safety circuit.

6. A safety circuit of an elevator, comprising:
a communications bus;
a plurality of nodes connected to the communications bus; and
one or more sensors and/or actuators, relating to the functionality of the safety circuit, connected to one or more of the plurality of nodes;
wherein one or more of the aforementioned nodes connected to the communications bus comprises
a memory, in which a program to be executed is stored; and
at least one microprocessor configured to perform the methods according to claim 1 for identifying a functional nonconformance of the safety circuit of the elevator.

7. The safety circuit according to claim 6, wherein the communications bus is a serial interface bus.

* * * * *